United States Patent
Stockard

(10) Patent No.: US 7,222,738 B1
(45) Date of Patent: May 29, 2007

(54) SORTING SYSTEM FOR MULTIPLE CONVEYOR BELTS

(75) Inventor: Richard Daniel Stockard, Kirkland, WA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/109,990

(22) Filed: Apr. 19, 2005

Related U.S. Application Data

(62) Division of application No. 10/356,386, filed on Jan. 29, 2003, now Pat. No. 7,007,807.

(51) Int. Cl.
*B07C 5/00* (2006.01)
*G06F 7/00* (2006.01)

(52) U.S. Cl. ............... 209/552; 209/586; 209/592; 700/223; 700/228; 700/230; 198/952

(58) Field of Classification Search ......... 209/702, 209/703, 592, 942, 598, 586, 552; 198/952; 700/305, 306, 223, 228–230
See application file for complete search history.

(56) References Cited

U.S. PATENT DOCUMENTS

| | | | | |
|---|---|---|---|---|
| 2,075,012 A * | 3/1937 | Baker | ............... | 198/418.5 |
| 2,548,524 A * | 4/1951 | Eckhoff | ............... | 99/331 |
| 3,372,635 A * | 3/1968 | Meyer | ............... | 99/339 |
| 3,665,491 A * | 5/1972 | Cooper | ............... | 219/701 |
| 4,276,465 A * | 6/1981 | Flavio | ............... | 219/388 |
| 4,441,003 A * | 4/1984 | Eves et al. | ............... | 219/700 |
| 4,475,762 A * | 10/1984 | DeLong et al. | ............... | 296/65.04 |
| 4,554,437 A * | 11/1985 | Wagner et al. | ............... | 219/388 |
| 4,605,161 A * | 8/1986 | Motomiya et al. | ............... | 236/15 BC |
| 4,717,572 A * | 1/1988 | Buller-Colthurst | ............... | 426/233 |
| 4,745,762 A | 5/1988 | Taylor | | |
| 5,197,375 A * | 3/1993 | Rosenbrock et al. | ............... | 99/328 |
| 5,558,234 A | 9/1996 | Mobley | | |
| 5,821,503 A * | 10/1998 | Witt | ............... | 219/388 |
| 6,056,109 A * | 5/2000 | Hidai et al. | ............... | 198/431 |
| RE36,941 E | 11/2000 | Wolfe et al. | | |
| 6,323,462 B1 * | 11/2001 | Strand | ............... | 219/388 |
| 6,396,031 B1 * | 5/2002 | Forrester | ............... | 219/494 |
| 6,408,842 B1 * | 6/2002 | Herrera | ............... | 126/41 C |
| 6,419,968 B1 * | 7/2002 | Wang et al. | ............... | 426/277 |
| 6,470,239 B1 * | 10/2002 | Schultz et al. | ............... | 700/299 |

(Continued)

*Primary Examiner*—Patrick Mackey
*Assistant Examiner*—Mark Hageman
(74) *Attorney, Agent, or Firm*—Christensen O'Connor Johnson Kindness PLLC

(57) ABSTRACT

An apparatus and a method for sorting workpieces (204) includes multiple conveyors (201, 202), a scanner (208), an offloading device (216), a workpiece processor (218), and a computer (210). The computer has instructions for carrying out a method for sorting that includes obtaining the physical parameters of the workpiece by scanning the workpiece, obtaining an updated distribution of a physical parameter of a population of workpieces, obtaining an updated loading on each conveyor, obtaining the workpiece processor's capacity, obtaining a processing parameter indicating the required amount of workpiece processing to be performed, and obtaining each conveyor's speed. This information is used to place the workpiece on a conveyor in a manner that is calculated to utilize the optimum amount of workpiece processor capacity, while at the same time maintaining an even belt loading. The computer is in communication with conveyor speed drivers (250, 252) and the offloader to adjust retention time and/or conveyor loading.

24 Claims, 11 Drawing Sheets

U.S. PATENT DOCUMENTS

| | | | |
|---|---|---|---|
| 6,481,999 B2 * | 11/2002 | Knost | 99/443 C |
| 6,539,934 B2 * | 4/2003 | Moshonas et al. | 126/21 A |
| 6,560,514 B1 * | 5/2003 | Schultz et al. | 700/299 |
| 6,981,582 B2 * | 1/2006 | Miller et al. | 198/456 |

* cited by examiner

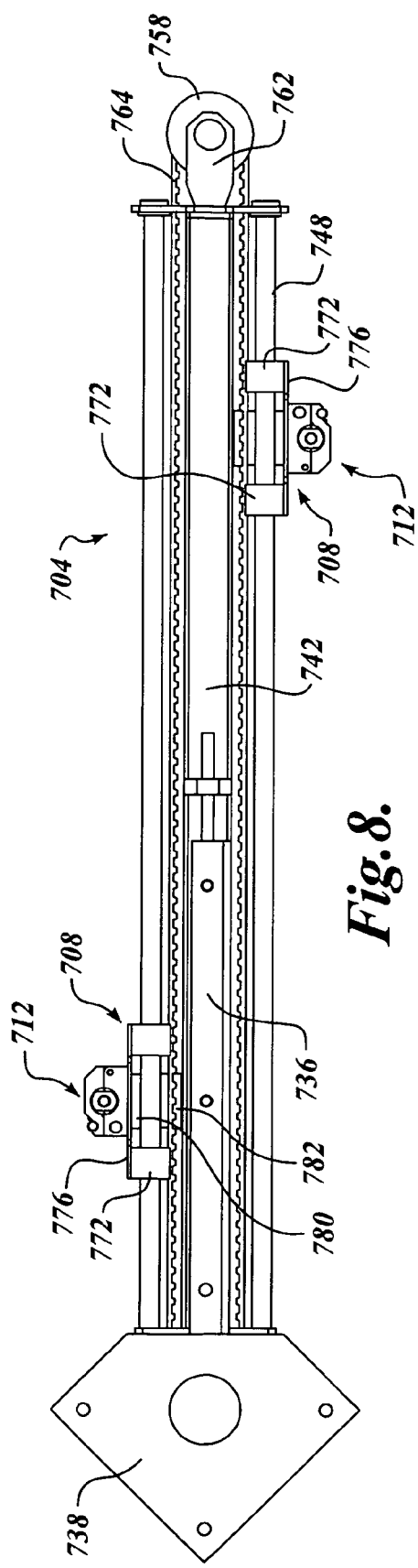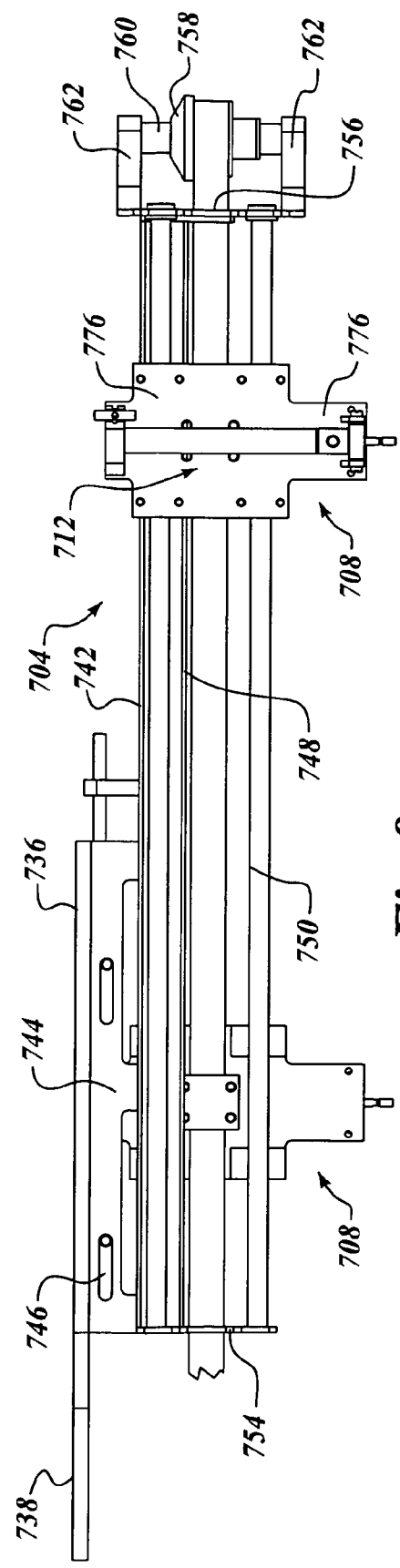
Fig. 8.
Fig. 9.

SORTING SYSTEM FOR MULTIPLE CONVEYOR BELTS

CROSS-REFERENCE TO RELATED APPLICATION

This application is a division of prior application Ser. No. 10/356,386, filed Jan. 29, 2003, now U.S. Pat. No. 7,007,807.

FIELD OF THE INVENTION

The present invention is directed to a method of controlling processes for systems utilizing multiple or single conveyor belts, for example, when freezing or cooking workpieces of varying sizes.

BACKGROUND OF THE INVENTION

Many freezing and cooking operations utilize conveyor belts that carry workpieces through a processing section of a freezer or an oven or even a series of freezers or ovens. In order to achieve the desired amount of freezing or cooking, the conveyor belt speed is set to a speed that will fully freeze or cook the largest of the workpieces. This is to ensure that all pieces meet the necessary minimum requirements, many times mandated by regulations. While this accomplishes the desired goal of not allowing workpieces to pass unprocessed or under pressure through the freezer or oven, the operation may be inefficient, since many of the workpieces will be unnecessarily overprocessed. Ideally, each workpiece would spend only the amount of time in the freezer or oven that is required to fully freeze or cook it to the required specifications, without significant loss of freezer or oven capacity.

One approach to this problem has been to "piece sort," meaning employing multiple conveyor belts within a single oven or freezer with each belt running at a different speed. This arrangement allows the workpieces to be sorted by size ahead of the processing operation. In a three-conveyor system, for example, the smallest pieces are placed on the fastest moving belt, the medium-sized pieces are placed on the next slowest belt, and the largest pieces are placed on the slowest belt. The size range for each conveyor may be determined from a manual sampling of workpiece sizes. By knowing the performance characteristics of the processing operation for the particular workpiece, each belt speed can be adjusted for a population of workpieces that fall within a certain size range. Utilizing multiple conveyor belts, and sorting ahead of the processing operation, may provide a temporary solution, but this situation may be short-lived. Due to the ever-changing variation in the sizes of workpieces, the initial sorting criteria may not be representative as time progresses. The inevitable result is a shift of product from the fastest belt to the slower belts if the average size of the workpieces was to increase. Conversely, if the average size was to decrease, the products would start to accumulate on the fastest moving belt. Too much product on one belt when the other belts are not at full capacity is also not utilizing resources to their fullest capability.

Another method of sorting is called "even flow," meaning the lines are kept as full as possible regardless of the workpiece weight or size. This practice leads to the possibility that workpieces will be over- or underprocessed.

An "even flow" sort alone may require overcooking or overfreezing product as the size distribution changes, without a change in retention time/conveyor speed. "Piece sorting" alone can move all product to a single retention time, making a single retention time a bottleneck, while other retention time line or belts are underutilized. Thus, the conventional ways of sorting can eventually lead to gross inefficiencies.

What is lacking in the art is a method of sorting by size combined with the ability to provide even product flow to maintain the belt's loading at its optimum. The present invention addresses this need and seeks to provide further related advantages.

SUMMARY OF THE INVENTION

The present invention is directed to an apparatus and to a method for sorting a workpiece to be processed by a heat engine or other apparatus in a multiple conveyor system. The apparatus has at least a first and a second conveyor, a scanner, an offloading device, a heat engine or other workpiece-processing apparatus, and a computer, wherein the computer has a sorting module with the executable instructions for carrying out the method according to the present invention. The method includes obtaining the weight, size, thickness, and/or other physical parameter(s) of workpieces. In one embodiment, these parameters can be obtained by scanning the workpiece. The method includes obtaining an updated distribution of a physical parameter for a population of workpieces. The updated distribution can be for the size, weight, or thickness of the workpiece. The method includes obtaining an updated loading on each conveyor in the multiple-conveyor system. Loading refers to the number of workpieces or the combined mass of workpieces on the conveyor. The method includes obtaining the capacity of the heat engine or other apparatus. The method obtains the processing time required for the workpiece based on the weight, size, thickness, and/or other physical parameters of the workpiece. The method includes obtaining each conveyor's speed. The speed determines the processing time required of the workpiece, i.e., the retention time, for example, the retention time of the workpiece in an oven or freezer. The method includes placing the workpiece on a conveyor based on the information. The information is utilized by a sorting module executed by a computer system. The computer determines on which of the conveyors to place the workpiece in a manner that is calculated to utilize the optimum amount of heat engine or other apparatus capacity, while at the same time maintaining conveyor loading at its optimum, and also providing that workpieces are not over- or underprocessed beyond acceptable tolerances. The sorting module is in communication with conveyor speed drivers and an offloader to adjust retention time or conveyor loading or both.

In one embodiment, the computer is constrained not to increase or decrease a conveyor's speed if it would result in a workpiece being underprocessed or overprocessed.

In one embodiment, the conveyor's speed is increased or decreased in response to the updated size distribution, where the updated size distribution indicates that the average workpiece size has either decreased or increased or other physical parameter has changed.

In one embodiment, the computer is constrained not to increase or decrease the conveyor loading if it would result in a workpiece being underprocessed or overprocessed.

The present invention provides for the optimization of heat engine or other processing apparatus capacity by gathering information on each workpiece, sorting according to an attribute of the workpiece, monitoring and/or adjusting the speed and loading on each conveyor, and placing the workpiece on the most desirable conveyor to achieve optimum heat engine capacity or other processing apparatus usage.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 8 shows a plan view illustration of a system portion for carrying out the present invention;

FIG. 9 shows a plan view illustration of a system portion for carrying out the present invention;

DETAILED DESCRIPTION OF THE PREFERRED EMBODIMENT

Figure 1:
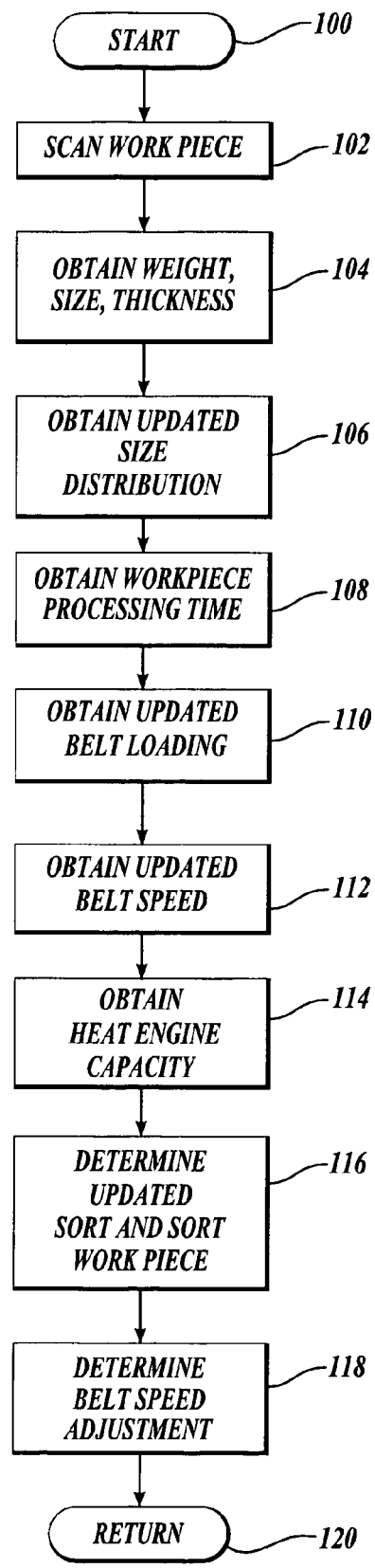
FIG. 1 is a flowsheet illustrating one embodiment of a sorting system according to the present invention.

A heat engine, whether a freezer, a chiller, an oven, or other apparatus, has an optimum processing capacity. The processing capacity is typically given as pounds per hour. The total product feed rate to the heat engine cannot exceed this rate, as the risk that product may be under processed is increased. Product may be moved continuously into and out of the heat engine with a conveyor at such speed that will adequately process the particular workpiece in question. Ideally, the workpiece should spend only as much time as is required to freeze, cook, or otherwise process the workpiece to the desired specifications within the acceptable tolerances. The conveyor speed is influenced by the heat transfer or other processing characteristics of the heat engine, physical parameters of the workpiece, for example, the size, shape, mass, thickness, and heat transfer or other relevant characteristics of the workpiece, along with perhaps many more attributes of greater or lesser importance. The conveyor's speed will also be influenced by the mass or quantity flow rate of product moving in and out of the heat engine, since greater mass/quantity requires greater heat engine capacity. In general, according to the invention, the energy output of the heat engine must be balanced with the mass coming into the heat engine at the point where the heat engine more or less operates at the maximum processing rate and only that amount of energy goes into the workpieces to produce the desired processing within some acceptable tolerances. It is now realized by the present inventor this can be accomplished by obtaining specific measurements of the system and using the information in a sorting module that may be executed by a computer system. The sorting module calculates optimum belt speeds and the belt loadings to achieve this. The sorting module is connected to equipment that directs the belt loading and belt speed. Adjusting only either belt speed or belt loading, as done in the prior art, leads to the aforementioned problems.

For workpieces that are individually substantially equal in size and weight, once determined, the speed or loading seldom needs to be adjusted. This is because the size of workpiece is constant; thus the ideal belt speed is almost the same for all workpieces. The belt loading can be gradually increased to find the flow rate that balances with the maximum energy output of the heat engine while also gradually slowing the belt as more mass moves through the heat engine. The system is considered in equilibrium when the belt loading is utilizing the maximum capacity of the heat engine, and the belt speed is running at a speed so that no workpiece is under- or overprocessed beyond acceptable tolerances.

The complexity increases when workpiece size is allowed to vary. Workpieces of varying sizes presents/challenges in maintaining the heat engine operating at its maximum rate. Previously, as practiced in the prior art, as the average size gradually diminished over time, the workpieces were allowed to be overprocessed, unnecessarily wasting heat engine capacity. If the average size gradually increased, the workpieces tended to become underprocessed, potentially exposing consumers to health risks caused by undercooked or underfrozen food. Some variance in the ideal processing can be tolerated, and is referred to as its "tolerance."

According to one aspect of the invention, the speed of one or more conveyors can be increased when the average size diminishes. On the other hand, the conveyor's speed can be decreased when the average size increases. At the same time, speed and size have an influence on heat engine capacity. The relationship between workpiece size, belt loading, and belt speed is too complex for operators alone to make, but requires large amounts of information, complex equations, and system modeling in order to be able to optimize the heat engine's capacity. For example, when the workpiece size diminishes, rather than increasing the belt speed, alternatively the belt loading, i.e., pounds per linear foot, can be increased. Computers have the ability to perform multitudes of calculations in a matter of fractions of a second. Therefore, a preferred mode for carrying out the invention is with a computer.

As mentioned previously, the use of multiple conveyors has been tried where each conveyor is limited to carrying only a specific size of workpiece. However, attempts to utilize multiple conveyors limited to a certain size are often ineffective because the methods do not take into account that the belt loading must also be considered. Belt loading should be "even flow," referring to the condition when the same number of workpieces, meeting certain size and weight criteria, on the belt passing through the heat engine during any given time period is more or less constant. Ideally, an infinite number of conveyors would be provided, one for each workpiece of different size and set to the specific speed ideally suited to process just that one workpiece. Practically, this is impossible to accomplish. However, multiple-conveyor systems having two, three, four, and greater numbers of conveyors are possible. The complexity to control all conveyors efficiently at correct speeds and loading to achieve the objective of optimizing heat engine capacity poses problems for even the most highly qualified and trained operator.

One embodiment of a method according to the invention relates to sorting a workpiece in a multiple-conveyor system. The method includes obtaining the weight and size, including the thickness and perhaps other physical characteristics of the workpiece, obtaining the size or other physical characteristic distribution of a population of workpieces including tracking the number of workpieces in the population, obtaining the updated loading on every conveyor that passes through the heat engine, obtaining the heat engine capacity, obtaining the processing time required for the workpiece, and obtaining the belt speeds of all the conveyors. A sorting module operates on information and directs an offloader to place the workpiece on a conveyor that results in the most optimum use of heat engine capacity. Optimum refers to the condition where the heat engine is being driven to operate at its maximum capacity. The sorting module also monitors and has the capability to adjust belt speeds. In performing the operations, the sorting module is limited to operate within certain constraints. For example, the sorting module does not permit a belt speed or belt loading reduction or increase that would result in any workpiece being over- or underprocessed. Over- or underprocessed refers to a workpiece being exposed to an amount of energy that would change the state of the workpiece outside of any desired specification ranges, which would include exceeding any tolerances. The method according to the invention then directs an offloading apparatus to place the workpiece on one of several conveyors calculated to optimize the usage of the heat engine capacity while no workpiece passes the heat engine underprocessed or overprocessed. The use of the above-mentioned variables are considered sufficient to manipulate the belt speed and belt loading to achieve optimized heat engine capacity usage.

The maximum heat engine capacity can be provided by the engine manufacturer. The processing, i.e., retention time, for any workpiece of given size, shape, weight, mass, and thickness can be determined by experimentation and, in some instances, may be supplied by vendors of the equipment. The size, shape, weight, mass, thickness, or any other suitable attributes of any workpiece can be determined by using known scanners utilizing any suitable source of energy, including x-ray or visible light. The size distribution of workpieces, including the number of workpieces at any given instant and the number of conveyors passing through the heat engine, can be used to update size, weight, or thickness criteria ranges and are assigned to each conveyor. When a new workpiece passes through the scanner and the size, weight, and thickness information is obtained, the size distribution can be updated by a computer. An updated sorting criteria range can be assigned to each conveyor and the workpiece can be sent to the appropriate conveyor assigned to the retention time for the size, weight, or thickness of the workpiece.

Another added functionality of a sorting module according to the invention could greatly improve on the aforementioned sorting process. The sort based on the updated size distribution is further constrained so as to provide "even flow" to every conveyor. Even flow attempts to distribute the number of workpieces evenly across all the conveyors in the system. To this end, the sorting module is constrained not to increase any conveyor speed if it would result in a workpiece on that conveyor being underprocessed. Also, the sorting module is constrained not to decrease the conveyor speed if it would result in a workpiece on that conveyor being overprocessed.

In further embodiments, the sorting module directs an increase in a belt's speed in response to the updated size distribution. In addition, the sorting module can direct a decrease in any belt's speed in response to the updated size distribution.

In another embodiment, the sorting module is constrained not to increase the belt's loading if it would result in a workpiece on that conveyor being underprocessed. Conversely, the sorting module is also constrained not to decrease the belt's loading if it would result in a workpiece on that conveyor being overprocessed.

This method according to the invention is diagrammatically illustrated in FIG. 1. The method includes loading the workpiece on the conveyor, block 101, and then scanning the workpiece, block 102. Numerous devices exist that are able to scan a workpiece utilizing x-rays, visible light, or other energy of suitable wavelength. A typical scanner includes a generator and a receiver. From the received energy, the scanner is able to determine the weight, shape, size, mass, thickness, length, porosity, or other attribute as depicted in block 104.

The information is stored in a computer, for example, along with the attributes of previous workpieces. From this information, an updated size or other attribute distribution is generated every time a workpiece passes the scanner, block 106. The method obtains the workpiece processing time, block 108. The workpiece processing time, i.e., or retention time, can be obtained by previous experiments to determine how much time in the heat engine will be required based on one or more attributes. The processing time of the workpiece can also be supplied by vendors. The method obtains the updated belt loading, block 110. The belt loading is determined by keeping track of the number or the mass of the combined workpieces on every conveyor. This is best suited by utilizing a computer system. The method obtains the updated belt speed, block 112. The belt speed for each conveyor can be determined by any suitable instrument. Again, a computer system is best suited to process this type of information. The method obtains the heat engine capacity, block 114. The heat engine capacity can be determined experimentally, or the heat engine capacity may be supplied by the device's vendor. A sorting module calculates the optimum sort, block 116, taking into consideration the information obtained in blocks 104–114, and arrives at an updated sort criteria every time a new workpiece is scanned. A sort criteria is a limit placed on the conveyor's ability to receive workpieces. The sort criteria is a measurable attribute of a workpiece, including, for example, size, weight, shape, mass, or thickness, or any combination thereof. For example, for a two-conveyor system, the sort may be 30%/70%, meaning 30% by weight is allocated to one conveyor and 70% by weight is allocated to the second conveyor. This is possible because the 30% of workpieces fall into a greater size range than do the 70% fraction and, thus, require a relatively longer retention time as compared to the smaller sized workpieces that comprise the remaining 70%. Based on the calculated sorting criteria, the workpieces are sorted, block 117, and belt speeds may have to be adjusted, block 120.

Figure 2:
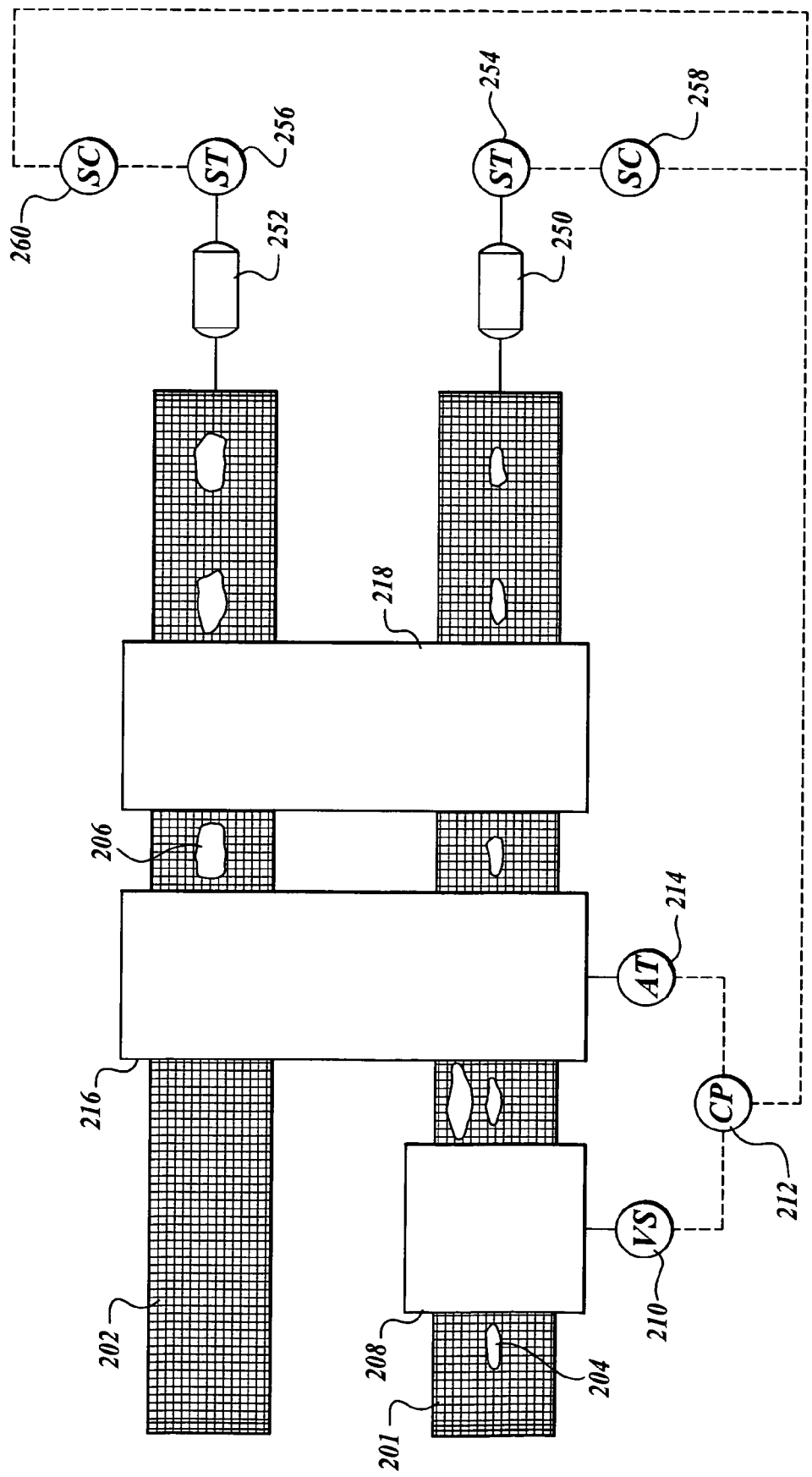
FIG. 2 shows a schematic illustration of one embodiment of a system for carrying out the present invention.

Referring now to FIG. 2, a schematic illustration of one embodiment of a system containing apparatus for carrying out the method according to the invention is illustrated. The system has a first and second conveyor, 201 and 202, a scanner 208, an offloading/transfer device 216, a heat engine 218, and a computer 212, having a sorting module with the executable instructions for carrying out the method according to the present invention. The system illustrated shows two conveyor belts, 201 and 202, passing through a heat engine 218; however, it is to be appreciated that more conveyors can be utilized. It is also to be appreciated that any number of heat engines can be placed in parallel or in series after each conveyor or in parallel with the conveyors. Heat engines can be freezers, ovens, chillers, fryers, and the like.

As used herein, the term "heat engine" is used to refer to an apparatus that is capable of adding heat to workpieces so as to, in some instances, cook the workpieces or of removing heat from workpieces so as to cool the workpieces, in some instances, to the temperature of freezing and below. Heat engines may have a plurality of sensors for measuring temperature, air velocity, and relative humidity at one or more processing zones. It is to be appreciated that the heat engine can be configured to vary any one of these or other parameters. For a description of temperature control of workpieces, reference is made to U.S. patent application Ser. No. 10/213,256, filed Aug. 5, 2002, incorporated herein by reference in its entirety. The methods and systems described in the '256 application may be applied to the present system to measure and control the temperature of workpieces simultaneously with sorting the workpieces. Workpiece as used herein broadly includes any item, which can be thermally or otherwise processed, including food items, such as meat patties and bone-in chicken breasts, for example.

Conveyors 201, 202 are shown as positioned parallel to one another and in a manner to move the incoming workpieces 204 through the thermal processing section of the heat engine 218. Heat engines may utilize the principles of radiation, convection, conduction, and condensation to process workpieces. The conveyors 201, 202 typically have a moving belt that slides over a support bed that may be constructed in a standard manner. Each conveyor belt 201, 202 may be driven at a selected speed by a drive system in a standard manner. The drive system of each conveyor 201, 202 can be composed of a variable-speed motor 250, 252, coupled to a conveyer speed controller 258, 256, respectively, to adjust the speed of the belt. Conveyors 201 and 202 also have a speed-sensing instrument 254 and 256, respectively. The workpieces may be carried on the conveyor belt to be processed by the heat engine 218 and then transported to other locations for further processing. The retention time of a workpiece in the heat engine 218 can be adjusted by use of the conveyor speed controllers 258, 260, knowing the measured speed.

Conveyor 201 serves as the feed conveyor delivering workpieces 204 to the system. A scanner 208 is mounted in a suitable location in proximity to conveyor 201 to be able to scan workpieces being carried on the conveyor 201. The scanner 210 is connected to a computer 212, including software for a sorting module, and software capable of processing the scanner signals. The entire system may be under control of the computer. The computer is capable of directing the operation of the offloader/transfer device 216, the belt speed controllers 256, 258, or any other ancillary equipment.

Referring still to FIG. 2, a second conveyor 202 is shown in parallel with the first conveyor 201. In one embodiment, the first conveyor 201 can be dedicated to delivering workpieces of all sizes to the system, while the second conveyor 202 may transport workpieces that have been sorted for being of a particular size, weight, or thickness. Any remaining workpieces are left on conveyor 201 to be processed by the heat engine 218. The second conveyor 202 also carries workpieces to be processed in heat engine 218. The scanner 208 is illustrated as being located ahead of the heat engine 218 and placed in proximity to conveyor 201. The scan subsystem 208 can independently include a video camera, X-ray machine or other apparatus, a processor, and a memory unit, used to determine the size, weight and thickness of every workpiece passing through the scanner 208. The scanner 208 is also capable of tracking items, determining their position on the conveyor 201 and producing a signal that is used to track the location of the workpiece to enable the offloader 216 to locate, pick up, and deliver the workpiece to conveyor 202. The output from the computer 212 is sent to a controller 214 on the offloader 216 that directs the positioning of a carriage structure having a pickup tool mounted thereon. Based on the signal produced by the scanner 208, the pickup tool is directed to pick up and place the tracked workpiece on the second conveyor 202. While only two conveyors are shown, it is to be appreciated that more conveyors may be utilized, each one having a different retention time. Other embodiments may have conveyor 201 terminate after the offloader 216, so that conveyor 201 does not pass through the heat engine 218. In this case, multiple conveyors can be positioned parallel to one another to receive workpieces from the offloader 216.

Figure 3:
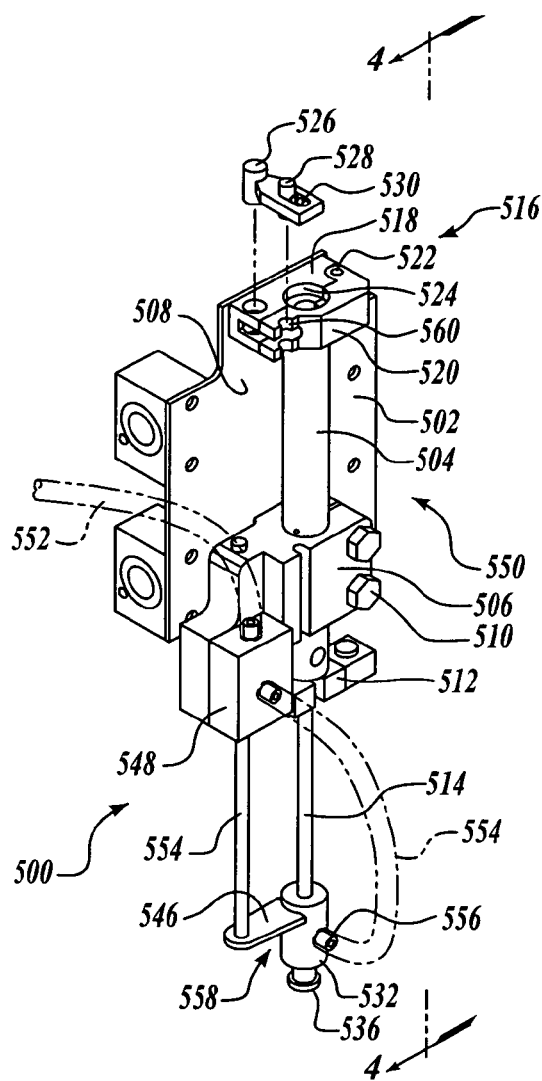
FIG. 3 shows an isometric illustration of a system portion for carrying out the present invention.
Figure 4:
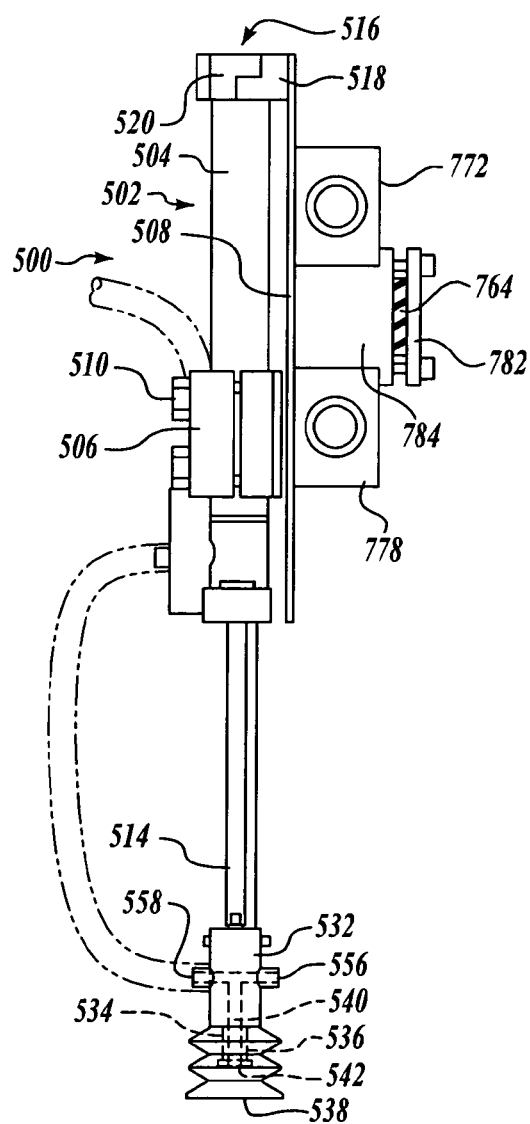
FIG. 4 shows a plan view illustration of a system portion for carrying out the present invention.
Figure 5:
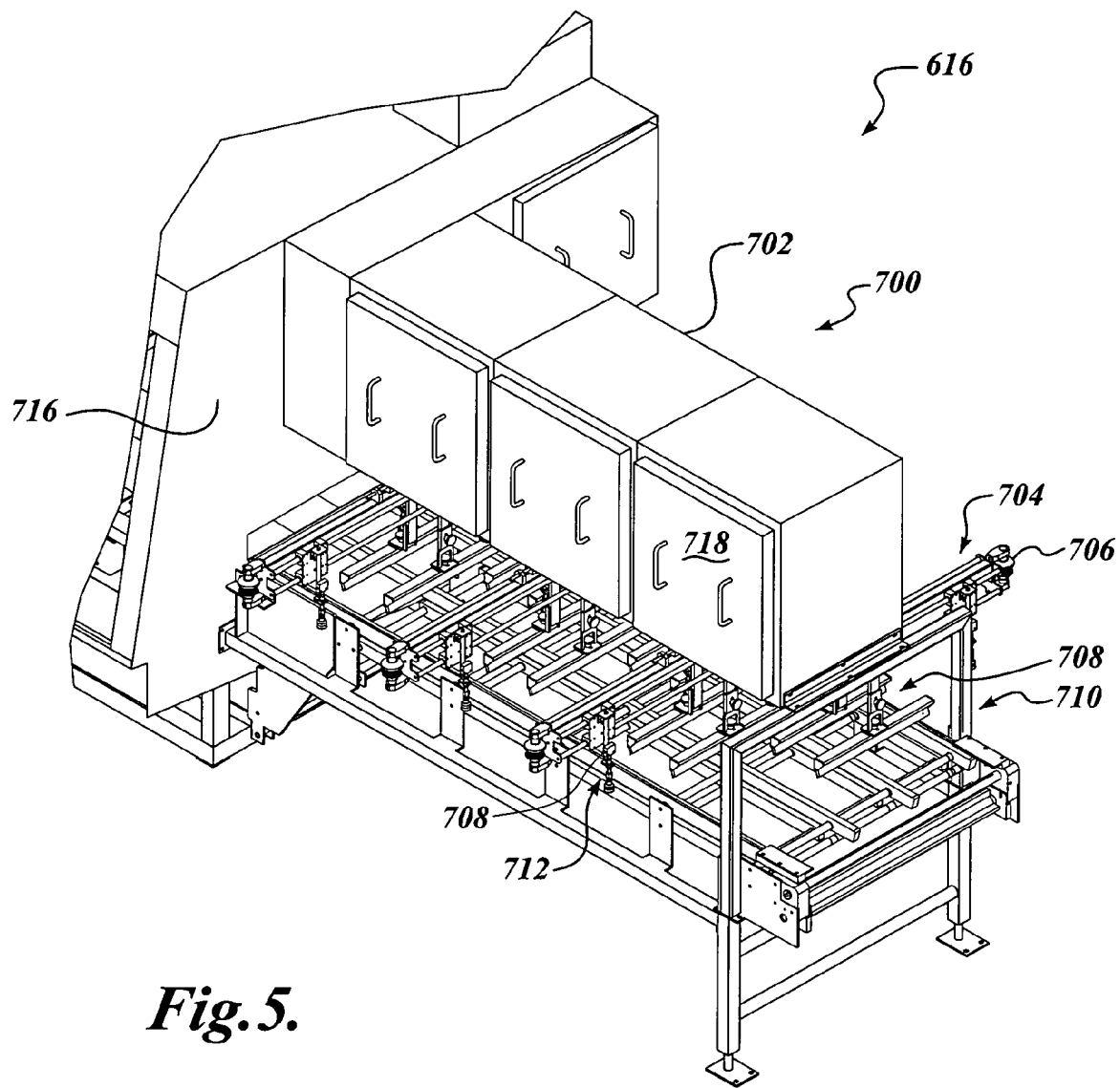
FIG. 5 shows an isometric illustration of a system portion for carrying out the present invention.
Figure 6:
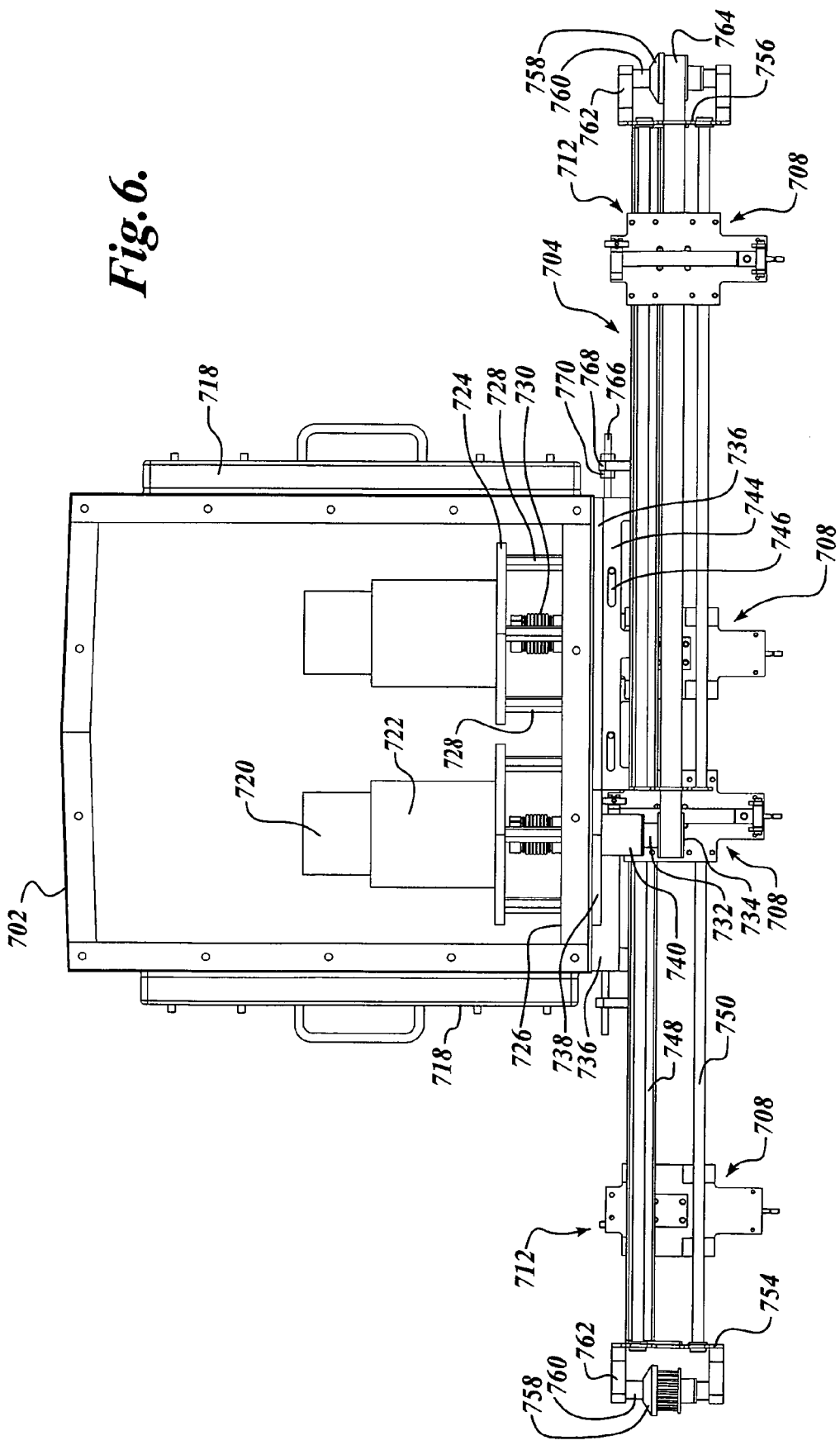
FIG. 6 shows a plan view illustration of a system portion for carrying out the present invention.
Figure 7:
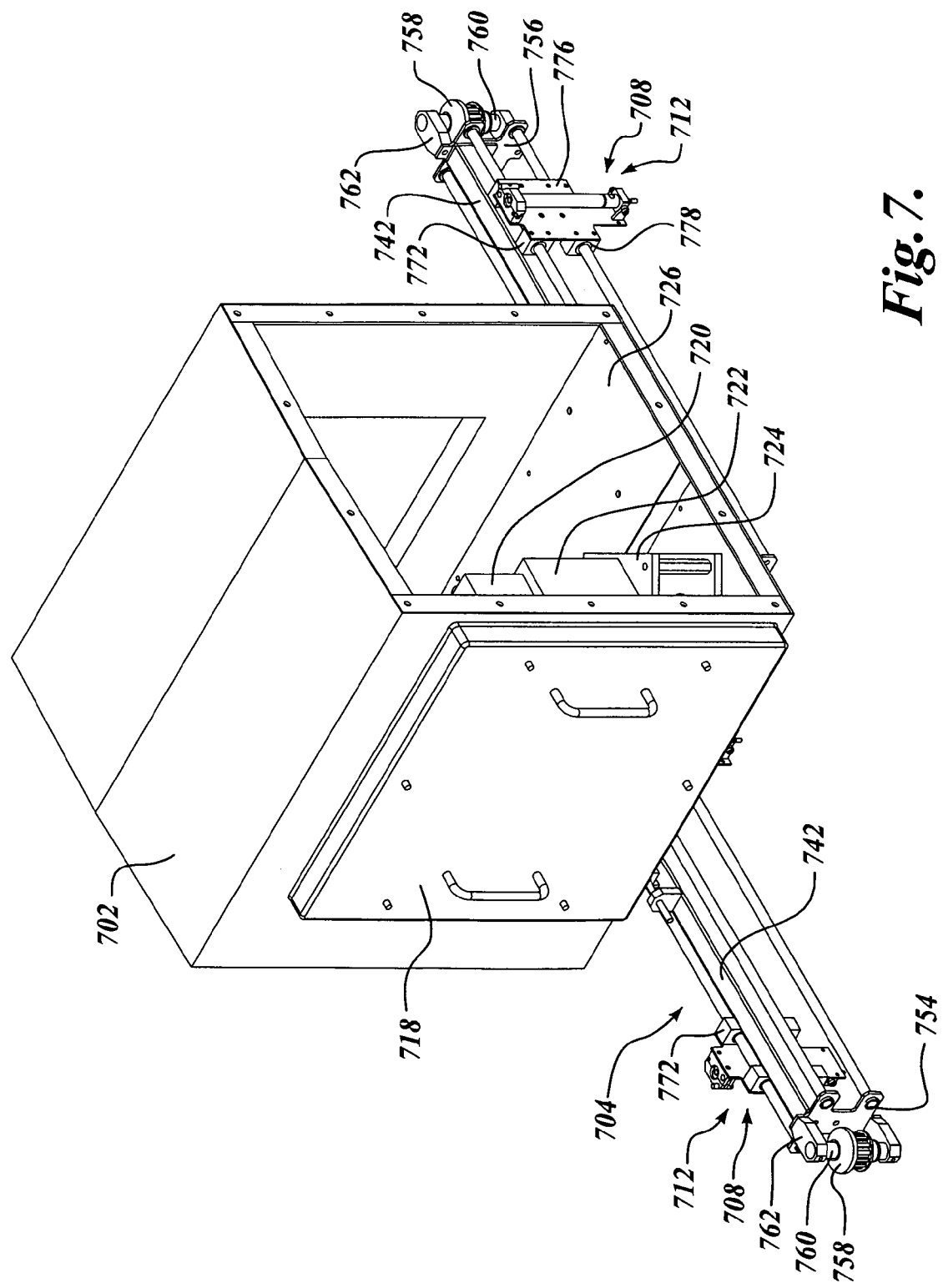
FIG. 7 shows an isometric illustration of a system portion for carrying out the present invention.

Illustrated in FIGS. 3, 4, 5, 6, 7, 8, and 9 is an offloader assembly of U.S. application Ser. No. 09/619,423 that can be used as an offloader in coordination with the scanner 208 for sorting workpieces onto one of multiple conveyors. Referring to FIG. 5, the offloader 616 includes one or a plurality of pickup tools 712 for removing selected workpieces from conveyors. If the offloader arrangement of FIG. 5 is used, the feed conveyor would be centrally located, while conveyors that pass through heat engine 218 would be positioned along the sides within the reach of the carriages 708.

One embodiment of the offload assembly 616 includes an overhead framed structure 700 that spans the adjacent end of a station cabinet 716 and a frame end structure 710. The overhead frame includes a plurality of side-by-side cabinets 702, each housing a drive system for associated pickup tools 712 positioned below the cabinets. Each of the cabinets is illustrated as being generally rectangular in shape and has a front access door 718. Three side-by-side cabinets 702 are illustrated, with the cabinets attached to each other to create a rigid, unitary beam structure. The drive system includes, among other components, a servomotor 720 schematically shown in FIG. 6 as positioned above a servomotor cooling fan 722, which in turn is positioned on a mounting platform 724 spaced above cabinet floor 726 by a plurality of support legs 728. A coupling 730 is attached to the output shaft (not shown) of the servomotor and also attached to the upper end of a drive shaft 732 that extends through an opening formed in cabinet floor 726. A drive pulley 734 is coupled to the lower end of the drive shaft 732.

The pickup tools 712 are carried by carriages 708 that ride along frame assemblies 704 that in turn are attached to the underside of cabinets 702 by a mounting bar 736 attached to and extending along the underside of the cabinet floor 726 in a direction generally transverse to the direction of travel of conveyor. The mounting bar 736 projects from a generally rectangular shaped mounting flange 738 also attached to the underside of the cabinet floor 726. A drive shaft hub 740 projects downwardly from a clearance hole formed in the mounting flange 738 for receiving the drive shaft 732 therethrough. Preferably, roller or other types of bearings are positioned within the upper and lower end portions of the hub 740 for positioning and supporting the drive shaft 732.

The carriage frame assemblies 704 each include a longitudinal beam 742 attached to the underside of an edge flange 744 projecting upwardly from the beam along a portion thereof that is positioned below a corresponding cabinet 702. Longitudinal slots 746 are formed in the edge flange 744 through which extend hardware members, for instance, bolts that engage within threaded cross-holes extending through mounting bar 736. In this manner, the frame assembly 702 may be longitudinally adjusted relative to the mounting bar 736, as will be discussed more fully below. Spaced-apart upper and lower rod tracks 748 and 750 are mounted to beam 742 at the ends of the rod tracks by end flange plates 754 and 756, which are attached to the ends of the beam 742. A pair of rod tracks 748 is located on each side of the beam 742. An idler pulley 758 is spaced outwardly from flange plate 756 on an upright support shaft 760, which in turn is attached to upper and lower mounting ears 762 projecting from the upper and lower portions of flange plate 756. An endless cog or gear belt 764 spans the drive pulley 734 and the idler pulley 760.

The tension on belt 764 may be adjusted by shifting the position of beam 742 and, thus idler pulley 758, relative to the drive pulley 734 so that moving the idler pulley away from the drive pulley will increase the tension on the belt 764, while shifting the idler pulley toward the drive pulley will reduce the tension on the belt. The movement of the beam 742 is accomplished through the use of a threaded stud 766 that projects outwardly from the end of mounting bar 736 through a clearance opening formed in a take-up tab 768 projecting upwardly from the upper surface of beam 742 at a position spaced a short distance from the end of the mounting bar. Hardware members in the form of nuts 770 are threadably engaged over stud 766 to bear against the opposite sides of the tab 768 to thereby position the tab relative to the end of the mounting bar 736. Once the desired tension of the belt 764 is achieved, the nuts 770 capture the tab 768 therebetween.

The pickup tools 712 are mounted on the carriages 708 carried by frame assemblies 774. The carriages 708 each include a slider block 772 secured to the four corner portions of a planar, substantially rectangular carriage plate 776. The slider blocks include clearance holes for receiving rod tracks 748, 750. Ideally, a bushing 778, or other antifriction device, is pressed or otherwise securely positioned within the clearance hole of the slider block to help the carriage antifrictionally slide along the frame assemblies 780.

The carriage 708 is secured to the backside of carriage plate 776 by a clamping plate 782, which presses the belt 764 against a clamping block 784, secured to the back surface of the carriage plate 776. The surface of the clamping plate 782 facing the belt may be grooved to match the contour of the belt teeth so as to securely retain the belt between the plate 782 and the block 784. Hardware members extend through clearance holes formed in the plate 508 above and below the belt, within aligned threaded holes formed in the block 784. In this manner, the belt 764 is securely attached to the pickup carriage 708 without having to drill holes or otherwise alter the belt 764.

Some embodiments, which are attached to the bed 456, do not require clamping plate 782, block 784, or slider blocks 772, 778.

It will be appreciated that with the apparatus of the present invention it is possible to continuously and quickly process workpieces, such as meat products. A computer is capable of keeping track of the sizes and other physical parameters of the workpiece as well as the location of each workpiece on the conveyors. The apparatus is capable of quickly, accurately, and repeatedly making distinctions among workpieces by which workpieces are graded and/or sorted. Moreover, meat products are processed in environments wherein the room temperature is typically at about 40 degrees, which is quite cold, and difficult for personnel to withstand on a daily basis; whereas the apparatus of the present invention is substantially immune to such cold temperatures.

Referring specifically to FIGS. 3 and 4, a suitable suction device for use as a pickup tool is illustrated. Pickup tools described herein can be used in the sorting offloader assembly 216. FIGS. 3 and 4 show a pickup tool for use with the offloader.

The suction device 500 includes a linear actuator in the form of a pneumatic cylinder assembly 502, which is secured to and carried by the carriages 708 or any other carriage described herein that can be translated. The pneumatic cylinder may be coupled to a suction device 500 as further described below. The cylinder portion 504 of each cylinder assembly is held in place on carriage 416 by a lower attachment block 506, which is mounted on the carriage bed 508 by hardware members. A close-fitting clearance hole is vertically formed in attachment block 506 to slidably receive cylinder portion 504 therein. The lower end of the cylinder portion 504 abuts the upper surface of an end block 512, which has a narrow slot formed therein to provide clearance for the cylinder rod 514, which projects downwardly from the cylinder portion 504. The upper end of the cylinder portion 504 is securely held in place by a quick-release clamp assembly 516 composed of a stationary half 518 and a pivotal half 520 hinged to the stationary half by a pin 522. The stationary half 518 and pivot half 520 of the clamp assembly 516 are shaped to define a circular receiving seat 524 for securely clamping against the upper end portion of the cylinder 504. The pivot half 520 is held in closed position by a spring-loaded pivot pin 526 that extends outwardly through clearance slots provided in the adjacent portions of clamp stationary half 518 and clamp pivot half 520 to extend through a clearance hole formed in a transverse pin 528. A compression spring 530 is engaged over the free end portion of pin 526 to press against transverse pin 528 so as to help retain the transverse pin engaged within a semicircular seat 560 formed in the pivot half 520.

Referring to FIGS. 3 and 4, a suction tip or head 532 is attached to the lower end of rod 514 for adherence to the workpiece being removed from conveyor. A compressible bellows cup assembly 534 is attached over an extension neck 536 projecting downwardly from the main body portion of tip 532. The bottom 538 of the bellows assembly is cup-shaped so as to achieve a secure attachment with the workpieces to be picked up. A center bore or passage 540 extends through the tip 532 and extension neck 536 to present an opening 542 at the bottom of the extension neck.

In certain situations, it may be important to keep the suction tip 532 from rotating to thereby maintain the orientation of the workpiece. This is accomplished by use of a guide rod 544 having its lower end fixed to a tab 546 projecting outwardly from the generally cylindrically shaped suction tip 532. The upper end portion of the rod 544 slides within a vertical clearance hole formed in the attachment block 506. In this manner, guide rod 544 is disposed in a spaced parallel relationship with cylinder rod 514. Other systems can be utilized to prevent the suction tip 532 from rotating.

Suction is applied to the suction tip 532 by use of a venturi assembly 548. Pressurized air is supplied to the venturi assembly 548 by supply line 552. The venturi creates a source of reduced air pressure that is transmitted to suction tip 532 by line 554, which is connected to a side port 556 formed in the body of suction tip 532. This side port is in fluid communication with the central air passageway 540 extending longitudinally upwardly from the bottom of the suction tip to the elevation of the side port. Ideally, an air valve (not shown) is used to supply pressurized air to the venturi 548 to generate a reduced-pressure air source when desiring to pick up a workpiece item, while also supplying pressurized air to a second side port 558 of the suction tip 532 when desiring to break the suction connection between the cup assembly 538 and the item, thereby disengaging the suction tip from the item. The side port 558 is also connected in fluid communication with the tip air passageway 540. The positive-pressure air source can also be used to "backblow" the suction tip 532 to clean out the suction tip or remove matter that may have become lodged therein. During this backblow operation, the air valve discontinues airflow to the venturi assembly 548 so as to not induce the matter to enter suction line 554.

Figure 10:
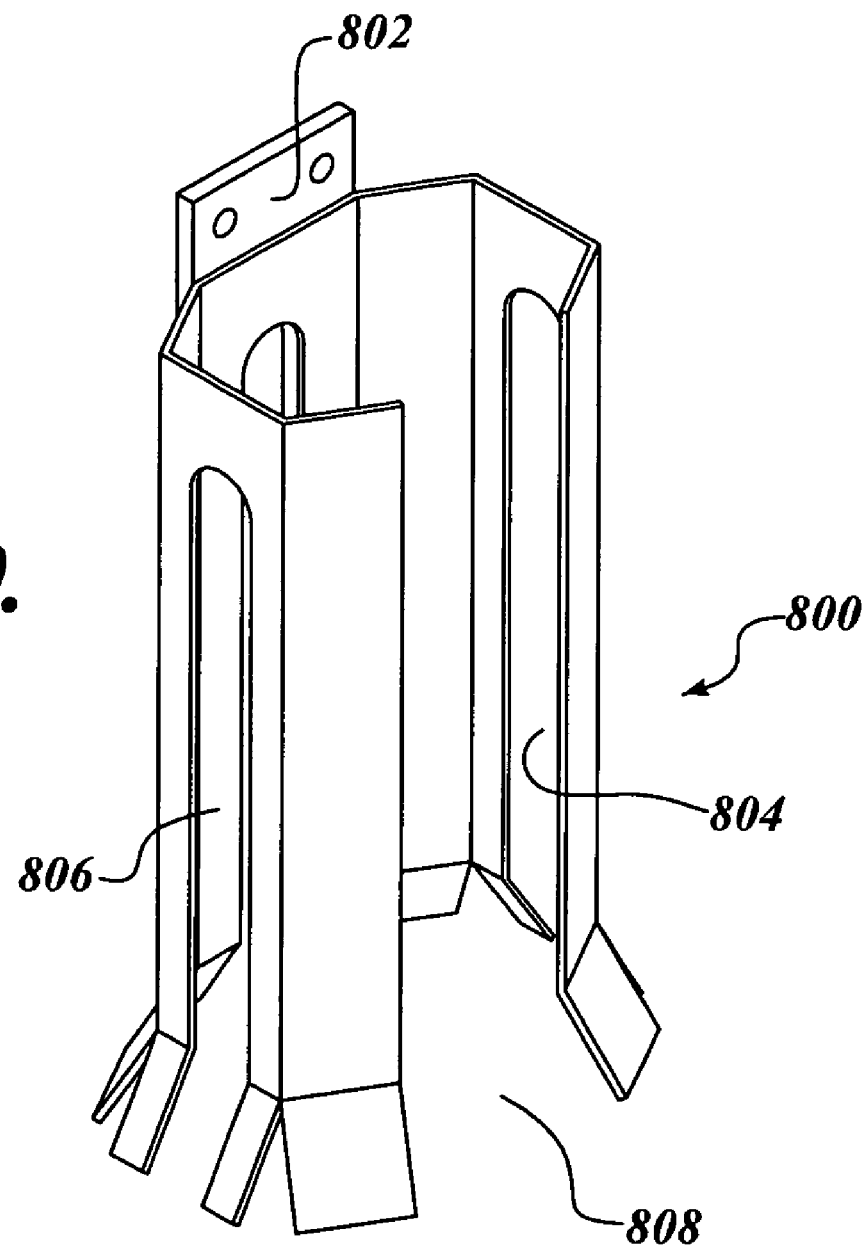
FIG. 10 shows an isometric illustration of a system portion for carrying out the present invention.

Referring specifically to FIG. 10, the pickup tools can include a retaining skirt or housing 800 designed to substantially surround the cylinder rod 514 and suction tip 532 of the pickup tool and thereby also surround the workpiece lifted off of the conveyors by the pickup tool, as described more fully below. The skirt 800 is mounted on the carriages by a tab 802 projecting upwardly from the skirt 800. Hardware members, not shown, extend through clearance holes formed in the tab to engage nuts (not shown). The skirt is generally in the shape of an octagon, with one panel missing to define a longitudinal gap 804 in the skirt to reduce the weight of the skirt. One or more of the panels may include slot 806 formed therein so as to reduce the weight of the skirt. At the bottom of the skirt, the panels flare outwardly so as to define an enlarged entrance opening 808 for the portioned workpiece as the portioned workpiece is lifted upwardly into the skirt by retraction of the pickup tool.

It will be appreciated that the skirt/housing 800 may be of configurations other than that illustrated in FIG. 10. In this regard, a cage structure (not shown) composed of wire elements or other structural members may be utilized in place of the skirt 800. Such cage structure would provide lateral restraint to the workpiece being carried by the pickup tool. As in the skirt/housing 800, the cage can be constructed with a bottom opening through which the workpiece passes upwardly when being removed from the conveyor and exits downwardly when being deposited at a location remote from the conveyor.

In general, when lifted upwardly, the workpiece enters the skirt or shroud 800 that substantially encircles the pickup device and the workpiece and restrains the workpiece as the carriage travels. This travel occurs very quickly generating a high acceleration when beginning its lateral movement and a high deceleration rate when coming to a stop. Without the skirt 800, the workpiece, especially if a food product, may tend to swing back and forth during the rapid acceleration and deceleration of the carriage.

Further examples of pickup tools are described in U.S. application Ser. No. 09/619,423, which is expressly herein incorporated by reference. The pickup tool is described above as utilizing suction action to grasp the workpieces. However, other types of methods may be employed to pick up the workpieces. For example, if the workpiece is composed of magnetically conductive material, the pickup tool may utilize a magnet. In addition, the pickup tool may consist of a clamp or jaw structure capable of physically grasping the workpiece for lifting off the conveyor and then releasing the workpiece at a desired remote location from the conveyor. Alternatively, the pickup tool may include forks or tines in place of the suction tip/head 532 to spear the workpiece. As a further alternative, the pickup tool may consist of very cold (below freezing temperature) tabs that "stick" to the workpiece thereby to pick up the workpiece from the conveyor.

The scanner 208, where workpieces are scanned to ascertain selected physical parameters, for example, their weight, size, and shape, including thickness are known. Information from the scanner is used to control the pickup tools or conveyors. In addition, it is possible to locate discontinuities (including voids), foreign material, and undesirable material in the workpiece, for example, bones or fat in a meat portion, and thus avoid them while probing. The scanning can be carried out utilizing a variety of techniques, including a video camera to view a workpiece illuminated by one or more light sources. Light from the light source is extended across the moving conveyor to define a sharp shadow or light stripe line, with the area forward of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor. This displacement represents the thickness of the workpiece along the shadow line/light stripe. The length of the workpiece is determined by the length of time that shadow lines are created by the workpiece. In this regard, an encoder is integrated into the scan structures, with the encoder generating pulses at fixed time intervals corresponding to the forward movement of the conveyor.

In lieu of a video camera, the scanning stations may instead utilize an x-ray apparatus for determining the physical characteristics of the workpiece, including its shape, mass, and weight. X-rays may be passed through the object in the direction of an x-ray detector. Such x-rays are attenuated by the workpiece in proportion to the mass thereof. The x-ray detector is capable of measuring the intensity of x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein in its entirety.

The data information measured/gathered by the scanning devices is transmitted to a computer, which records the location of the workpiece on the conveyor as well as the shape and other parameters of the workpiece. With this information, along with previously gained information, the computer determines the appropriate sort.

Figure 11:
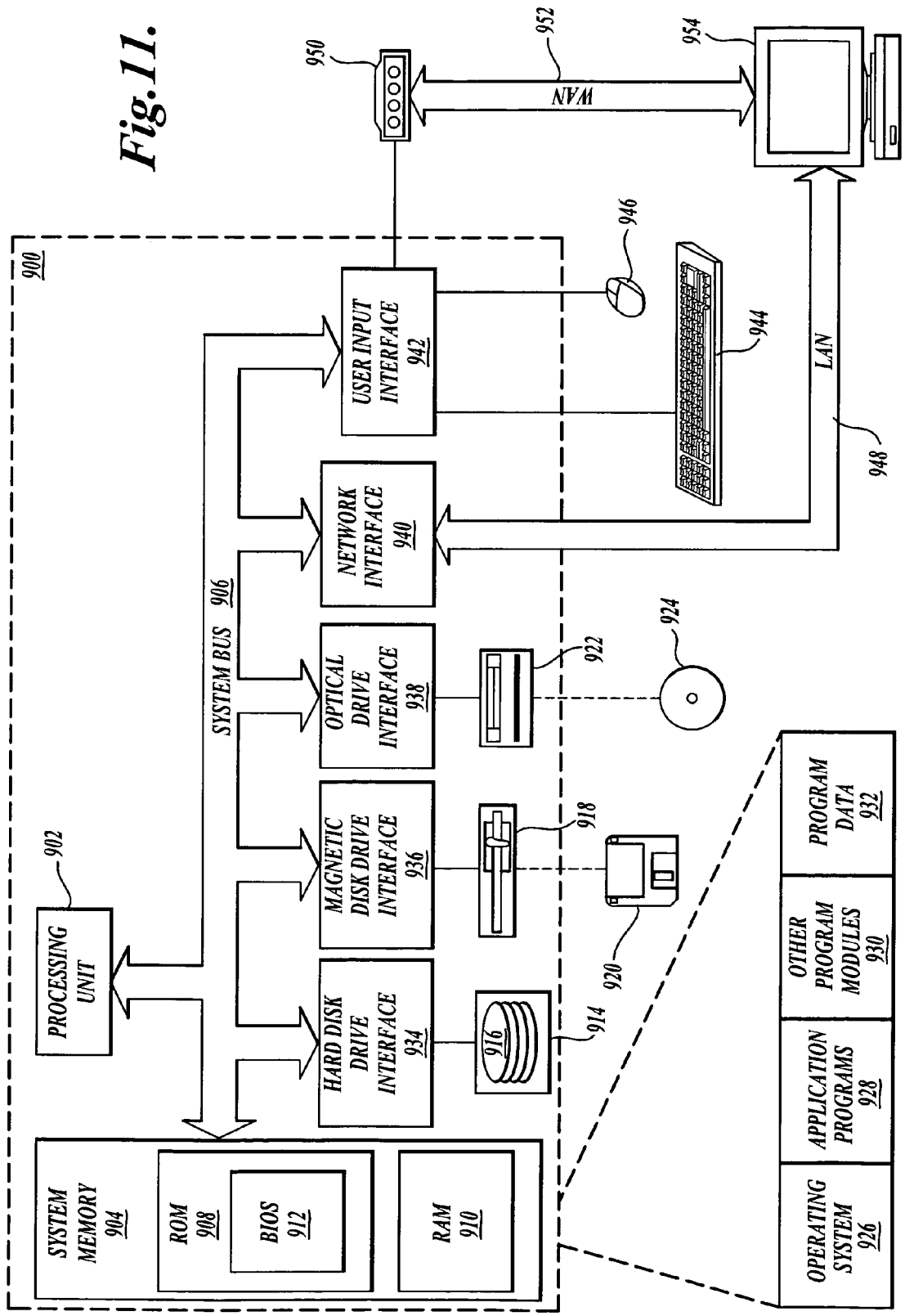
FIG. 11 shows a graphical illustration of a computer system for carrying out the present invention.

FIG. 11 illustrates an example of a suitable computing system environment in which the sorting module may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the invention includes a general purpose computing device in the form of a computer 900. Components of a computer 900 include, but are not limited to, a processing unit 902, a system memory 904, and a system bus 906 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 900 typically includes a variety of computer-readable media. Computer-readable media can be any available media that can be accessed by the computer 900 and include both volatile and nonvolatile media, removable, and nonremovable media. By way of example, and not limitation, computer-readable media may comprise computer storage media and communication media. Computer storage media include, but are not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium that can be used to store the desired information and which can be accessed by the computer 900.

The communication media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner to encode information in the signal. By way of example, and not limitation, communication media include wired media such as a wired network or direct wired connection, and wireless media such as acoustic, RF, infrared, and other wireless media. Combinations of any of the above should also be included within the scope of computer-readable media.

The system memory 904 includes computer storage media in the form of volatile and/or nonvolatile memory such as read-only memory (ROM) 908 and random-access memory (RAM) 910. A basic input/output system 912 (BIOS), containing the basic routines that help to transfer information between elements within the computer 900, such as during startup, is typically stored in ROM 908. RAM 910 typically contains data and/or program modules that are immediately accessible to and/or presently being operated on by the processing unit 902. By way of example, and not limitation, FIG. 11 illustrates an operating system 926, application programs 928, other program modules 930, and program data 932.

The computer 900 may also include removable/nonremovable, volatile/nonvolatile computer storage media. By way of example only, FIG. 11 illustrates a hard disk drive 914 that reads from or writes to nonremovable, nonvolatile magnetic media 916, a magnetic drive 918 that reads from or writes to a removable, nonvolatile magnetic disk 920, and an optical disk drive 922 that reads from or writes to a removable, nonvolatile optical disk 924, such as CD-ROM, or other optical media. Other removable/nonremovable, volatile/nonvolatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 914, magnetic disk drive 918, and optical disk drive 922 may be connected to the system bus 906 by a hard disk drive interface 934, a magnetic disk drive interface 936, and an optical drive interface 938, respectively. Alternatively, the hard disk drive 914, magnetic disk drive 918, and optical disk drive 922 are typically connected to the system bus 906 by a Small Computer System Interface (SCSI).

The drives and their associated computer storage media discussed above and illustrated in FIG. 11, provide storage of computer-readable instructions, data structures, program modules and other data for the computer 900. In FIG. 11, for example, the hard disk drive 914 is illustrated as storing the operating system 926, application programs 928, other programs 930, and program data 932. Note that these components can either be the same as or different from the operating system 926, the other program modules 930, and the program data 932. A user may enter commands and information into the computer 900 through an input device such as a keyboard 944 and/or a pointing device 946, commonly referred to as a mouse, track ball or touch pad. Other input devices (not shown) may include a microphone, a joystick, a game pad, a satellite dish, a scanner, or the like. These and other input devices are often connected to the processing unit 902 through user input interface 942 and may be connected by other interface and bus structures, such as a parallel port, game port, fire wire port or other universal serial bus (USB).

The computer 900 may operate in a network environment using logical connections to one or more remote computers 954. The remote computer 954 may be a personal computer, a server, a router, a network PC, a peer device or other common network node, and typically includes many or all of the elements described above relative to the computer 900, although only a memory storage device has been illustrated in FIG. 11. The logical connections depicted in FIG. 11 include a local area network (LAN) 948 and a wide area network (WAN) 952, but can also include other networks. Such network environments are commonplace in offices, enterprise-wide computer networks, Intranets, and the Internet.

When used in a LAN network environment, the computer 900 may be connected to the LAN 948 through a network interface adapter 940. When used in a WAN network environment, the computer typically includes a modem 950 or other means for establishing communications over the WAN 952, such as the Internet. The modem, which may be internal or external, may be connected to the system bus 906 via the serial port interface or other appropriate mechanism. In a networked environment, program modules depicted relative to the computer 900, or portions thereof, may be stored in the remote memory storage device. By way of example, and not limitation, FIG. 11 illustrates remote application programs 928 as residing on memory device 904. It will be appreciated that the network connections shown are exemplary and other means of establishing communication between the computers may be used. Although many other internal components of the computer 900 are not shown, those of ordinary skill will appreciate that such components and their interconnection are well known. Accordingly, additional details concerning the internal construction of the computer 900 need not be disclosed in connection with the present invention.

Those skilled in the art will understand that program modules such as the operating system 926, the application programs 928, and data 932 are provided to the computer 900 via one of its memory storage devices, which may include ROM 908, RAM 910, hard disk drive 914, magnetic disk drive 918, or optical disk device 922. The hard disk drive 914 is used to store data 932 and the programs, including the operating system 926 and application programs 928.

When the computer 900 is turned on or reset, the BIOS 912, which is stored in ROM 908 instructs the processing unit 902 to load the operating system 926 from the hard disk drive 914 into the RAM 910. Once the operating system 926 is loaded into RAM 910, the processing unit executes the operating system code and causes the visual elements associated with the user interface of the operating system to be displayed on the monitor. When a user opens an application program 928, the program code and relevant data are read from the hard disk drive and stored in RAM 910.

Aspects of the present invention can be embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted-wire pair, coaxial cable, or optical fiber, while communication links between networks may utilize 56 Kbps analog telephone lines, 1 Mbps digital T-1 lines, 45 Mbps T-3 lines, or other communications links known to those skilled in the art. Furthermore, computers and other related electronic devices can be remotely connected to either the LANs or the WAN via a digital communication device, modem and temporary telephone, or a wireless link. The Internet has recently seen explosive growth by virtue of its ability to link computers located throughout the world. As the Internet has grown, so has the WWW.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat, and others. Other interactive hypertext environments may include proprietary environments, such as those provided by a number of online service providers, as well as the "wireless Web" provided by various wireless networking providers, especially those in the cellular phone industry. It will be appreciated that the present invention could apply in any such interactive communication environments; however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text that link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A remote access user may retrieve hypertext documents from the World Wide Web via a Web browser program. A Web browser, such as Netscape's NAVIGATOR® or Microsoft's Internet Explorer®, is a software application program for providing a user interface to the WWW. Using the Web browser via a remote request, the Web browser requests the desired hypertext document from the appropriate Web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the Web server, such as JAVA® applets, for execution on the client computer. Finally, the WWW browser may include optional software components called plug-ins that run specialized functionality within the browser.

Figure 12:
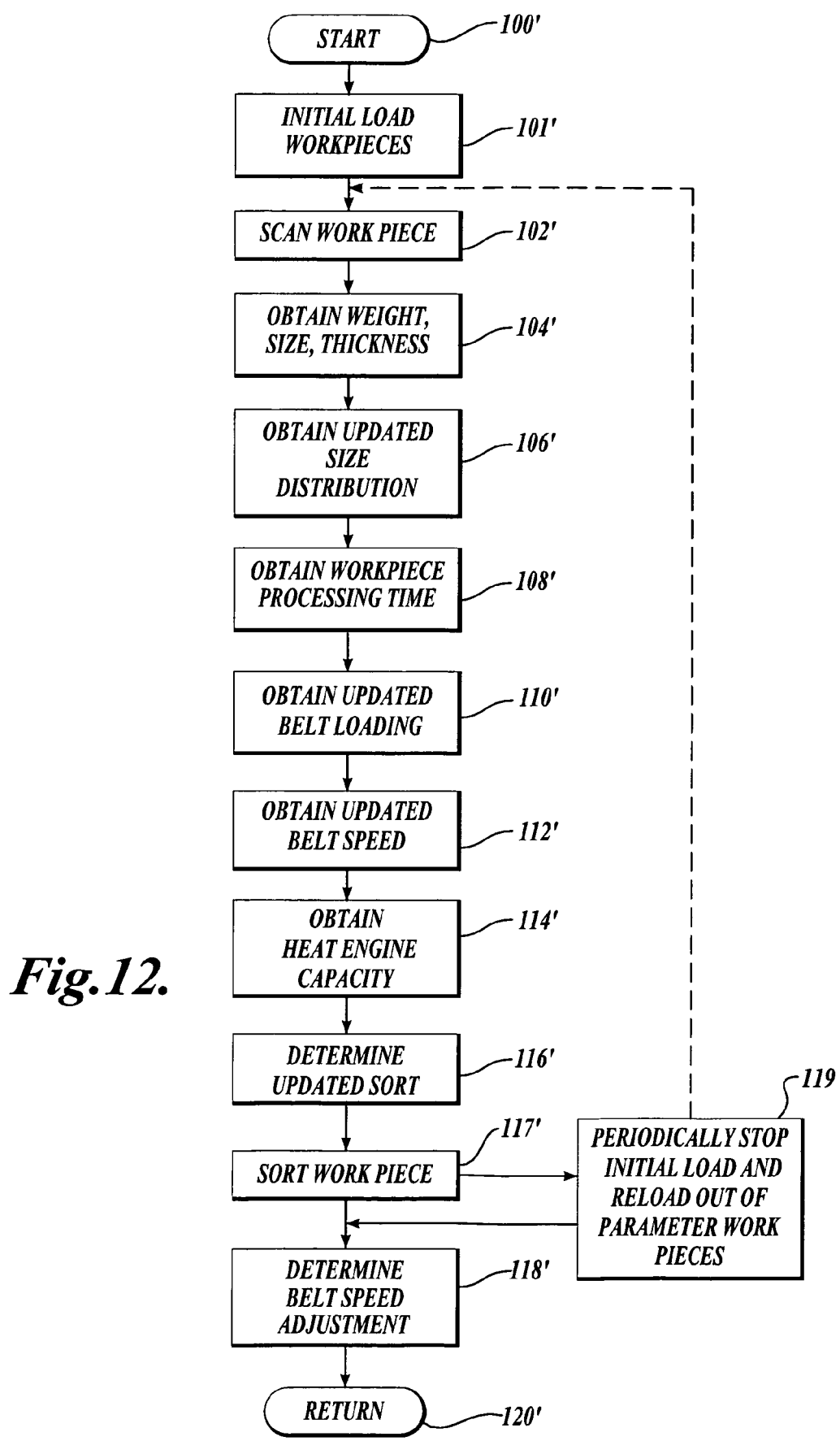
FIG. 12 is a flow diagram illustrating a further embodiment of a sorting system according to the present invention.
Figure 13:
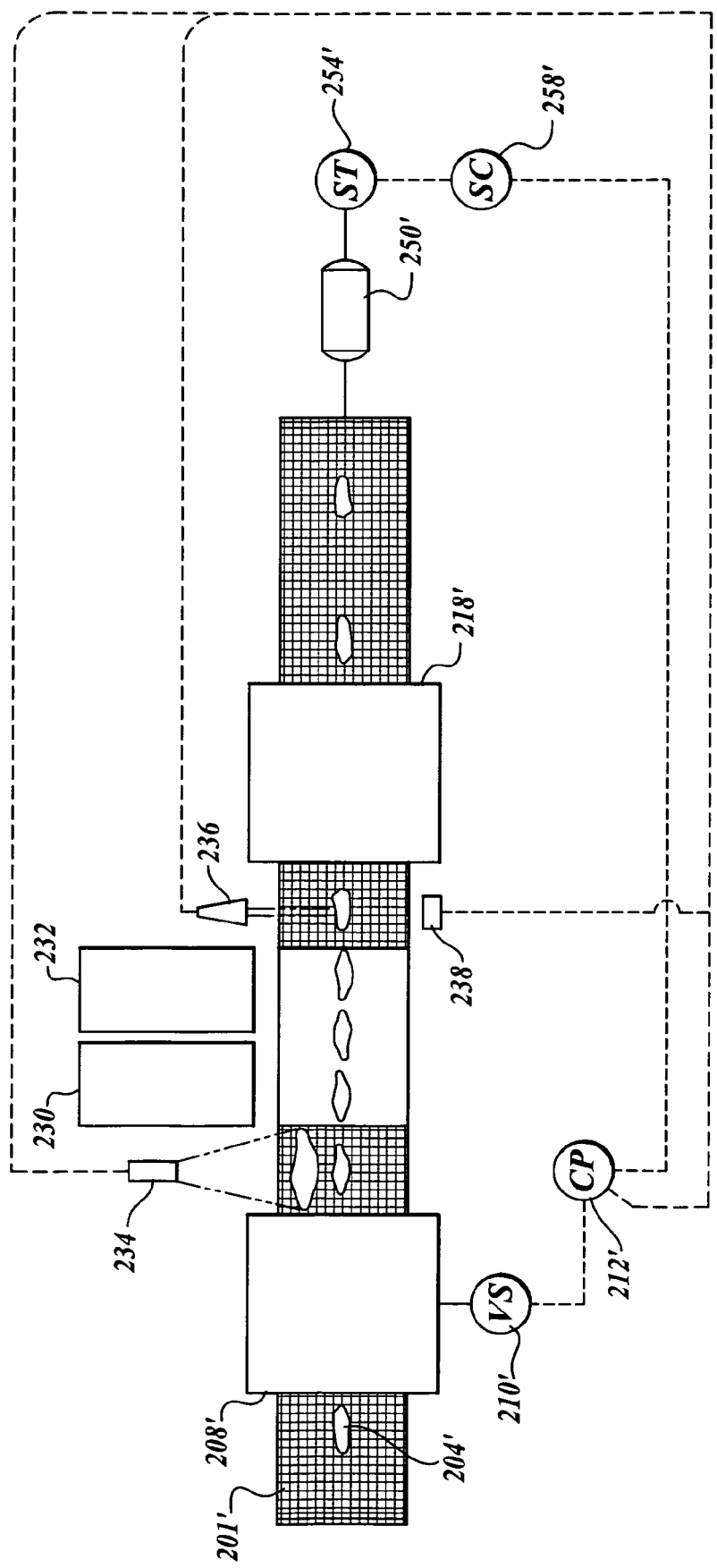
FIG. 13 is a schematic illustration of the embodiment of the present invention shown in FIG. 12.

A further embodiment of the present invention is shown in FIGS. 12 and 13. In this embodiment those aspects of the present invention that are the same or correspond with that shown in FIGS. 1 and 2 are identified using the same part number, but with the addition of like prime "'" designation. The embodiment of the present invention illustrated in FIGS. 12 and 13, although similar to that of FIGS. 1–11, uses a singular conveyor system 201' to move incoming workpieces 204' past a scanning station 210' and then to an offloading station 216', whereby "out-of-parameter" workpieces are unloaded while the "within-parameter" workpieces are processed by a heat engine 218'. The out-of-parameter workpieces 204' removed at station 216' are stored in a bin 230. Periodically the workpieces accumulated in bin 230 are processed by the heat engine 218'.

To describe the present embodiment in more detail, initially referring to FIG. 12, the steps of the present embodiment are similar to that shown in FIG. 1, but with some variation. In this regard, the workpieces 204' are loaded onto the conveyor at block 101'. Thereafter, the workpieces are scanned at block 102' using one or more of the methods described above. The scanning process is able to ascertain the weight, shape, size, mass, length, thickness, porosity, physical composition, chemical composition, or other attributes, as depicted in block 104'. This information ascertained from the scanning step is stored in a computer 212' along with the same attributes of previous workpieces. Using this information, an updated size or other attribute distribution is generated every time a workpiece passes block 106'.

The present method also obtains the workpiece processing time, or retention time, from block 108'. As described above, such processing or retention time can be obtained from previous experiments or from processing equipment vendors.

The present invention in addition obtains the updated belt loading, block 110', which is determined by keeping track of the number or the mass of the combined workpieces on the conveyor 201', preferably through use of the computer system 212'. The belt speed for the conveyor is determined, block 112' and the heat engine capacity, block 114'.

Next, a sorting module calculates the optimum sort of the workpieces, block 116', to determine which workpieces are to remain on the conveyor and which are to be removed at block 117'. The sorting module takes into consideration the information obtained in blocks 104'–114', and then arrives at an updated sort criteria every time a new workpiece is scanned. A sort criteria may be a limit placed on the conveyor's ability to receive workpieces or retain workpieces already on the conveyor. The sort criteria may be a measurable attribute of the workpiece, including one or more of those attributes determined at block 104', above. The sort criteria also may take into consideration that only a limited percentage of those workpieces initially loaded on the conveyor, at block 101', can be removed from the conveyor, at block 117, for example, in the range of 1%–5% of the workpieces initially loaded onto the conveyor. The sort criteria may further take into consideration quality control factors, such as the probability the workpieces will be either over- or under-processed depending on the workpieces that remain on the conveyor. Of course, such quality control criteria may also be factored into the speed of the conveyor system.

The sort criteria is used to designate which workpieces should be removed from the conveyor, block 117'. Such workpieces may be removed automatically from the conveyor using the equipment described above, or may be removed manually from the conveyor. To assist in manually removing such "out-of-parameter" workpieces from the conveyor, such workpieces to be removed may be identified for the workmen. Such identification can occur in numerous ways, for instance, by illuminating the workpieces to be removed. Such illumination can be carried out using an overhead light system, including, for example, the laser system that shines a light on the workpiece to be removed. This enables the workmen to easily determine which workpieces are to be removed from the conveyor. Without such assistance, it may not be practical for workmen to remove out-of-parameter workpieces from the conveyor since the workpieces that are to remain on the conveyor and those that are to be moved may be very difficult to visually distinguish.

In addition, the present invention may utilize a system to verify whether or not an out-of-parameter workpiece has been removed from the conveyor. For example, if the workpiece passes the transfer/removal station 216' without being removed from the conveyor, this condition can be transmitted to the computer 212', and then the speed of the conveyor system 102 or operating parameter of the heat engine 218 may be altered or other steps taken so that the presence of the out-of-parameter workpiece on the conveyor system is accommodated, whereby such out-of-parameter workpiece is properly processed even though it does not fit the preselected parameters for those workpieces that are to remain on the conveyor.

Periodically, the initial loading of the workpieces, block 101', is suspended so that the workpieces that have been removed from the conveyor can be reloaded on the conveyor system, block 119, and processed by the heat engine. As an alternative, the workpieces removed from the conveyor may be transferred to another location for alternative processing.

The present system is capable of retaining the distribution of the one or more physical parameters for the population of workpieces that have been removed from the conveyor. As such, when such out-of-parameter workpieces are loaded back onto the conveyor, the present invention, through use of the computer 212, can automatically adjust the speed of the conveyor system and/or the operational characteristics of the heat engine to obtain prime, so that the reloaded out-of-parameter workpieces are properly processed.

It will be appreciated that the out-of-parameter workpieces may be removed from the conveyor system because they are either above the parameter limit that has been set by the present system for optimum workpiece processing being achieved, or below the selected parameter(s) for the workpieces that are to remain on the conveyor. As such, when the out-of-parameter workpieces are reloaded onto the conveyor, they are reloaded in their own "groups," so that proper processing of such reloaded workpieces can occur.

If it is not possible or feasible or practical for the computer system to retain the physical parameters of the workpieces removed from the conveyor, such workpieces can be reloaded onto the conveyor at a location so that they can be rescanned at block 201' so that the desired physical parameters of the relocated workpieces can be determined and the distribution of the physical parameters of the reloaded workpieces can be ascertained. With this information and the belt loading and heat engine capacity, the required belt speed or operating parameters of the heat engine can be adjusted so that the reloaded workpieces are properly processed.

As discussed above, with respect to the embodiment of FIGS. 1–11, the embodiment of FIGS. 12 and 13 is also capable of automatically making adjustments to the processing system depending on changes in the physical parameters of the workpieces being loaded onto the conveyor system. For example, if the workpieces are being processed by a freezer, and if the workpieces increase in size over time, the present invention is capable of making appropriate adjustments, such as by decreasing the speed of the conveyor belt, reducing the loading on the conveyor belt, and/or changing the operating characteristics of the freezer.

FIG. 13 is a schematic illustration of one embodiment of a sorting system for carrying out the method of the present invention illustrated in FIG. 12. The sorting system shown in FIG. 13 includes many of the same components as shown in FIG. 2, and like components are identified with the same part number in FIG. 13, but with the addition of a prime "'" designation. Further, the description of these corresponding components will not be repeated here in detail.

Referring to FIG. 13, the system includes conveyor 201' on which workpieces 204' are initially loaded upstream from a scanner 208'. The conveyor 201' may be driven at a selected speed by a variable-speed motor 250'. A speed-sensing instrument 254' senses the speed of the conveyor, which information is routed to computer 212'. The computer is capable of adjusting the conveyor speed using a conveyor speed controller 258', as described above.

The workpieces 204' initially loaded on the conveyor are carried by the conveyor past a scanner 208'. The scanner 208' is connected to the computer 212'. As described above, the computer 212' includes software for a sorting module as well as software capable of processing signals from the scanner 208'. As also previously discussed, the scanner 208' can include various types of scanning equipment, including a video camera, an X-ray machine, or other scanning devices as well as a processor and memory unit used to determine the size, weight, thickness, mass, shape, length, porosity, or other physical attribute of every workpiece passing through the scanner 208'. The scanner is also capable of tracking the workpieces, determining their position on the conveyor 201', and producing a signal that is used to track the location of the workpiece. Alternatively, the scanner itself may not include a processor or memory unit, but rather, these components may be part of the computer 212'.

The scanner, together with the computer, determines the optimum sort of the workpieces and decides which workpieces are to remain on the conveyor and which workpieces are to be removed as being out-of-parameter based on the set criteria being utilized. Such out-of-parameter workpieces may be above the set criteria, for example, too large, or below the set criteria, for example, too small. Such out-of-parameter workpieces may be removed from the conveyor 201' and placed in a bin 230 for above criteria workpieces, or in a bin 232 for below criteria workpieces. This offloading can occur automatically using an off-loading device, such as device 616, described above. Alternatively, the out-of-parameter workpieces may be removed from the conveyor 201' manually and placed into either bin 230 or 232 by a workman.

Depending on the sort criteria utilized it may be difficult for a workman to visually distinguish between an in-parameter workpiece that is to remain on the conveyor 201' and those out-of-parameter workpieces that are to be manually removed and placed into bin 230 or 232. To assist the workman, a laser 234, under the control of computer 212', may be employed to illuminate or "paint" the particular workpiece to be removed. Moreover, the laser 234 may paint above criteria workpieces in one color and below criteria workpieces in another color to help make sure that the out-of-parameter workpieces are placed in the correct bins 230 or 232.

Typically, the criteria for sorting the workpieces will factor in a practical maximum percentage of workpieces that a workman could realistically remove from the conveyor system, for example, in the range of about 1–5% of the workpieces. Nonetheless, a workman may still miss a workpiece to be removed. This can be ascertained by use of a sensing device, such as a light beam apparatus 236 that shines a light down on the conveyor 201. If a workpiece is present, the beam from source 236 is interrupted and does not reach a receiver 238 located below the conveyor if the light beam is located above the conveyor, or on the opposite side of the conveyor if the light beam is located to the side of the conveyor. However, if a workpiece is not present, the light beam will reach the receiver 238. Thus, if the workpiece that is out-of-parameter remains on the conveyor as ascertained by the light beam and receiver, the central processor can automatically adjust for this fact by, for example, altering the speed of or loading on the conveyor during the time the out-of-parameter workpiece is within the heat engine 216' or altering one or more parameters of the heat engine 216'.

As mentioned above, periodically, for example when the collection bins 230 or 232 are full, the initial loading of the workpieces on the conveyor 201' may be suspended so that the workpieces within the bins 230 and 232 may be placed on the conveyor and processed by the heat engine 216'. As also noted above, if the computer 212' is capable of retaining the attribute distribution of the workpieces in the bins 230 and 232, the workpieces from these bins may be placed on the conveyor just upstream of the heat engine 216' and the computer 212' will automatically adjust the speed of the conveyor, the loading on the conveyor, and/or operating characteristics of the heat engine so that the workpieces from bins 230 and 232 are properly processed.

Alternatively, the workpieces from the bins 230 and 232 may be placed on the conveyor 201 upstream from the scanner 208' so that such out-of-parameter workpieces may be rescanned and the belt loading determined so that the speed of the belt and/or operating parameters of the heating engine 218' may be adjusted to properly process the out-of-parameter workpieces. Once the out-of-parameter workpieces have been processed, the initial loading of the workpieces 201' can be resumed.

It will be appreciated that the embodiment of the present invention shown in FIGS. 12 and 13 may be advantageously utilized in situations in which it is not practical to use an automated system to offload workpieces from the conveyor onto another conveyor for processing, especially if a wide range of different products is processed using the system of the present invention. Moreover, there is a large installed base of heat engines utilizing a single conveyor belt system, and it may not be practical to adapt such heat engines to utilize multiple conveyors. In such situations, the present invention may be advantageously integrated into existing processing equipment.

While the preferred embodiment of the invention has been illustrated and described, it will be appreciated that various changes can be made therein without departing from the spirit and scope of the invention.

The invention claimed is:

1. A method for sorting workpieces to be processed by a workpiece processor in a multiple-conveyor system, comprising:
   (a) obtaining one or more physical parameters of the workpieces;
   (b) obtaining an updated distribution of one or more physical parameter(s) for a population of workpieces;
   (c) obtaining an updated loading on each conveyor;
   (d) obtaining a processing capacity of the workpiece processor;
   (e) obtaining one or more processing parameter(s) indicating the amount of processing of the workpieces required by the workpiece processor;
   (f) obtaining the speed that each conveyor conveys workpieces;
   (g) processing the information obtained from steps (a)–(f) by a computer system to determine on which of the conveyors to place the workpieces; and
   (h) sorting the workpieces based on the processed information at step (g).

2. The method of claim 1, wherein the workpiece processor is a heat engine.

3. The method of claim 2, wherein the heat engine is one from the group consisting of a freezer, oven, or chiller.

4. The method of claim 1, wherein the updated distribution of a physical parameter is selected from the group consisting of: size, weight, thickness, length, surface area, density, porosity, chemical composition, or physical composition.

5. The method of claim 1, wherein one or more processing parameters is time.

6. The method of claim 1, wherein the computer system controls each conveyor's speed, based on one or more parameters selected from the group consisting of: one or more physical parameters of the workpiece, the distribution of physical parameters for a population of workpieces, the loading on the conveyor, the processing capacity of the workpiece processor and the amount of workpiece processing required or desired.

7. The method of claim 6, wherein the computer system is constrained not to increase a conveyor's speed if it would result in a workpiece on a conveyor being underprocessed.

8. The method of claim 6, wherein the computer system is constrained not to decrease a conveyor's speed if it would result in a workpiece on a conveyor being overprocessed.

9. The method of claim 6, wherein a conveyor speed is adjusted in response to the updated distribution, said updated distribution indicating that the workpiece's physical parameter has changed.

10. The method of claim 1, wherein the computer system controls an offloader to adjust to each conveyor's loading.

11. The method of claim 10, wherein the computer system is constrained not to adjust a conveyor's loading if it would result in a workpiece on a conveyor being underprocessed.

12. The method of claim 10, wherein the computer system is constrained not to adjust a conveyor's loading if it would result in a workpiece on a conveyor being overprocessed.

13. An apparatus for sorting workpieces to be processed by a workpiece processor in a multiple-conveyor system, comprising:
   a first conveyor for carrying workpieces to a scanner;
   a scanner located along the first conveyor to scan workpieces;
   an offloader to transport workpieces from the first conveyor to a second conveyor;
   a workpiece processor to process the workpieces on the second conveyor; and
   a computer with executable instructions for:
   (a) obtaining one or more physical parameters of the workpieces;
   (b) obtaining an updated distribution of a physical parameter for a population of workpieces;
   (c) obtaining an updated loading on each conveyor;
   (d) obtaining a processing capacity of the workpiece processor;
   (e) obtaining a processing parameter indicating the amount of processing of the workpiece required by the workpiece processor;
   (f) obtaining a speed that each conveyor conveys workpieces; and
   (g) processing the information obtained from steps (a)–(f) by a computer system to determine on which of the conveyors to place the workpieces.

14. The apparatus of claim 13, wherein the workpiece processor is a heat engine.

15. The apparatus of claim 14, wherein the heat engine is one from at least a freezer, oven, or chiller.

16. The apparatus of claim 13, wherein the updated distribution of a physical parameter is from the group consisting of size, weight, or thickness.

17. The apparatus of claim 13, wherein the processing parameter is time.

18. The apparatus of claim 13, wherein the computer system controls each conveyor speed.

19. The apparatus of claim 18, wherein the computer system is constrained not to increase a conveyor's speed if it would result in a workpiece on a conveyor being underprocessed.

20. The apparatus of claim 18, wherein the computer system is constrained not to decrease a conveyor's speed if it would result in a workpiece on a conveyor being overprocessed.

21. The apparatus of claim 13, wherein a conveyor speed is adjusted in response to the updated distribution, said updated distribution indicating that the workpiece's physical parameter has changed.

22. The apparatus of claim 13, wherein the computer system controls the offloader to adjust each conveyor's loading.

23. The apparatus of claim 22, wherein the computer system is constrained not to adjust a conveyor's loading if it would result in a workpiece on a conveyor being underprocessed.

24. The apparatus of claim 22, wherein the computer system is constrained not to adjust a conveyor's loading if it would result in a workpiece on a conveyor being overprocessed.

* * * * *